United States Patent
Mochida et al.

(10) Patent No.: US 10,872,207 B2
(45) Date of Patent: Dec. 22, 2020

(54) DETERMINING TRANSLATION SIMILARITY OF REVERSE TRANSLATIONS FOR A PLURALITY OF LANGUAGES

(71) Applicant: Panasonic Intellectual Property Management Co., Ltd., Osaka (JP)

(72) Inventors: Tetsuji Mochida, Osaka (JP); He Cai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 16/223,173

(22) Filed: Dec. 18, 2018

(65) Prior Publication Data
US 2019/0213261 A1    Jul. 11, 2019

(30) Foreign Application Priority Data
Jan. 9, 2018    (JP) .................................. 2018-001414

(51) Int. Cl.
*G06F 40/51* (2020.01)
*G06F 40/58* (2020.01)
(Continued)

(52) U.S. Cl.
CPC .............. *G06F 40/58* (2020.01); *G06F 40/51* (2020.01)

(58) Field of Classification Search
CPC .......... G06F 40/40; G06F 40/47; G06F 40/51; G06F 40/58
(Continued)

(56) References Cited

U.S. PATENT DOCUMENTS

2004/0254781 A1* 12/2004 Appleby ................. G06F 40/45
704/2
2005/0055217 A1*  3/2005 Sumita .................... G06F 40/45
704/277

(Continued)

FOREIGN PATENT DOCUMENTS

| JP | 2016-157252 | 9/2016 |
| JP | 2016-218995 | 12/2016 |
| JP | 6160438 B | 7/2017 |

*Primary Examiner* — Martin Lerner
(74) *Attorney, Agent, or Firm* — McDermott Will & Emery LLP

(57) ABSTRACT

A translation device includes an input unit configured to receive an input sentence in an original language, a controller configured to generate a first translation sentence obtained by translation of the input sentence into a first language, and a display. The controller generates a second translation sentence obtained by translation of the input sentence into a second language different from the first language, a first reverse translation sentence obtained by reverse translation of the first translation sentence into the original language, and a second reverse translation sentence obtained by reverse translation of the second translation sentence into the original language. The controller calculates first similarity as similarity between the first reverse translation sentence and the input sentence, and determines, in accordance with the first similarity, whether to display the first translation sentence on the display or to generate a third translation sentence obtained by translation of the second reverse translation sentence into the first language.

8 Claims, 11 Drawing Sheets

(51) Int. Cl.
*G06F 40/40* (2020.01)
*G06F 40/47* (2020.01)

(58) Field of Classification Search
USPC .......................................... 704/2, 3, 7, 8, 277
See application file for complete search history.

(56) References Cited

U.S. PATENT DOCUMENTS

| | | | |
|---|---|---|---|
| 2012/0265518 A1* | 10/2012 | Lauder | G06F 40/51 704/3 |
| 2013/0268259 A1* | 10/2013 | Kim | G06F 40/58 704/7 |
| 2014/0100843 A1* | 4/2014 | Tanaka | G06F 40/51 704/2 |
| 2014/0288915 A1* | 9/2014 | Madnani | G06F 40/58 704/2 |
| 2014/0350913 A1* | 11/2014 | Cheng | G06F 40/51 704/2 |
| 2014/0358524 A1* | 12/2014 | Papula | G06F 40/51 704/9 |
| 2016/0092437 A1* | 3/2016 | Endo | G06F 40/51 704/4 |
| 2016/0350290 A1 | 12/2016 | Fujiwara et al. | |
| 2018/0101522 A1 | 4/2018 | Fujiwara et al. | |
| 2019/0042663 A1* | 2/2019 | Gupta | G06F 40/279 |
| 2019/0179908 A1* | 6/2019 | Nakao | G06F 40/51 |

\* cited by examiner

FIG. 9
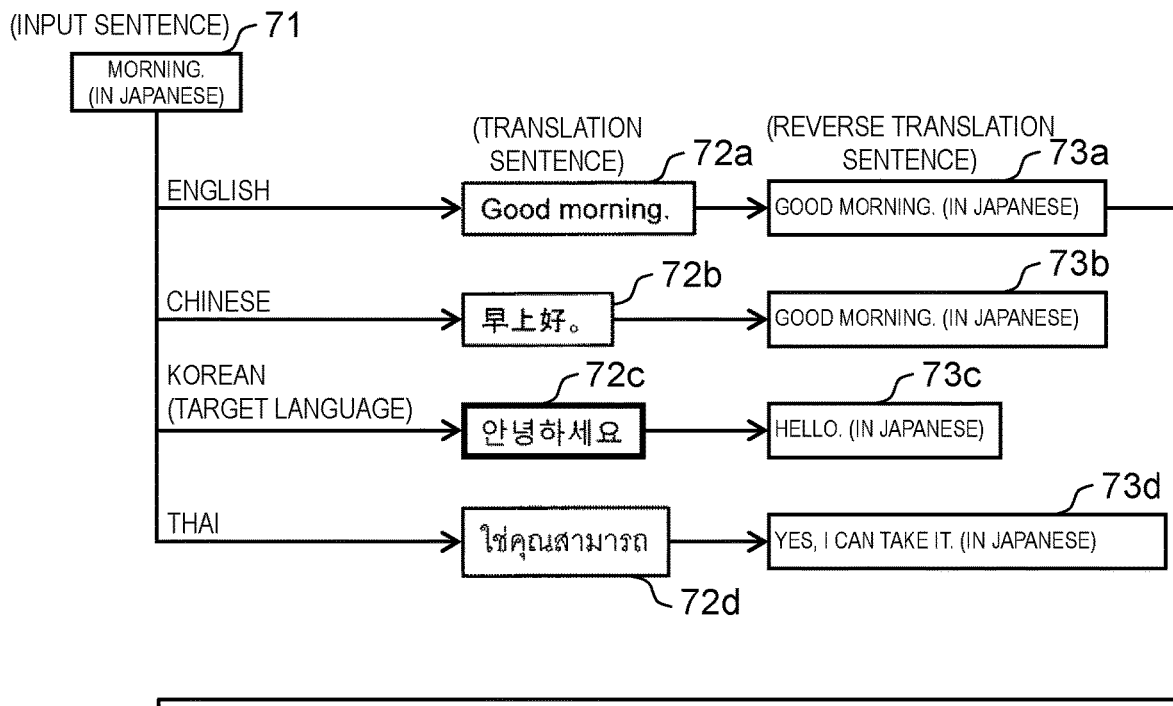
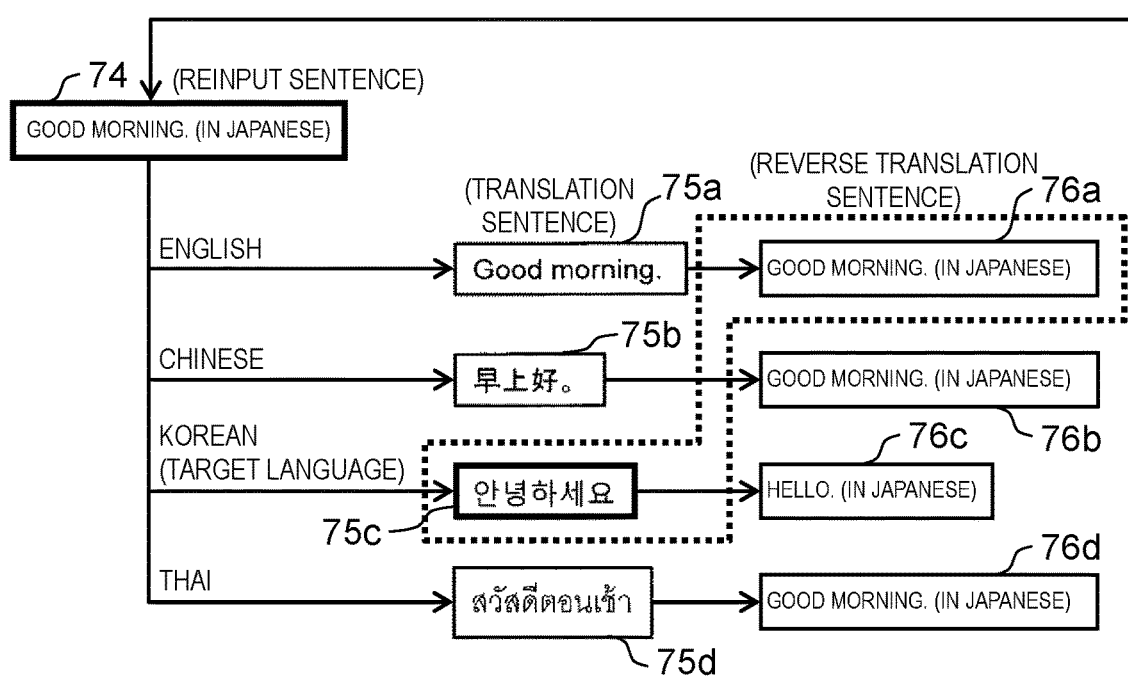

US 10,872,207 B2

DETERMINING TRANSLATION SIMILARITY OF REVERSE TRANSLATIONS FOR A PLURALITY OF LANGUAGES

BACKGROUND

1. Technical Field

The present disclosure relates to a translation device configured to translate an input sentence in a language into another language, a translation method, and a recording medium.

2. Description of the Related Art

Unexamined Japanese Patent Publication No. 2016-157252 discloses a verification device configured to verify whether or not reverse translation sentences generated from translation sentences in different languages are identical with each other. This verification device generates reverse translation sentences from translation sentences generated in a plurality of languages by a plurality of translators. The verification device compares the plurality of reverse translation sentences and outputs a difference data list indicating differences. The translators correct the translation sentences with reference to the difference data list. This enables efficient check of variations among multilingual translation sentences to obtain multilingual translation sentences having no variations.

SUMMARY

The present disclosure provides a translation device and a translation method achieving accurate translation, as well as a recording medium.

The translation device according to the present disclosure includes an input unit configured to receive an input sentence in an original language, a controller configured to generate a first translation sentence obtained by translation of the input sentence into a first language, and a display. The controller generates a second translation sentence obtained by translation of the input sentence into a second language different from the first language, a first reverse translation sentence obtained by reverse translation of the first translation sentence into the original language, and a second reverse translation sentence obtained by reverse translation of the second translation sentence into the original language. The controller calculates first similarity as similarity between the first reverse translation sentence and the input sentence, and determines, in accordance with the first similarity, whether to display the first translation sentence on the display or to generate a third translation sentence obtained by translation of the second reverse translation sentence into the first language.

These general and specific aspects may be achieved by a system, a method, a computer program, or any combination among these.

The translation device, the translation method, and the recording medium according to the present disclosure achieve accurate translation.

BRIEF DESCRIPTION OF THE DRAWINGS

FIG. 9 is a view specifically exemplifying translation and reverse translation according to the second exemplary embodiment;

DETAILED DESCRIPTION (Definition of Terms)

Figure 1:
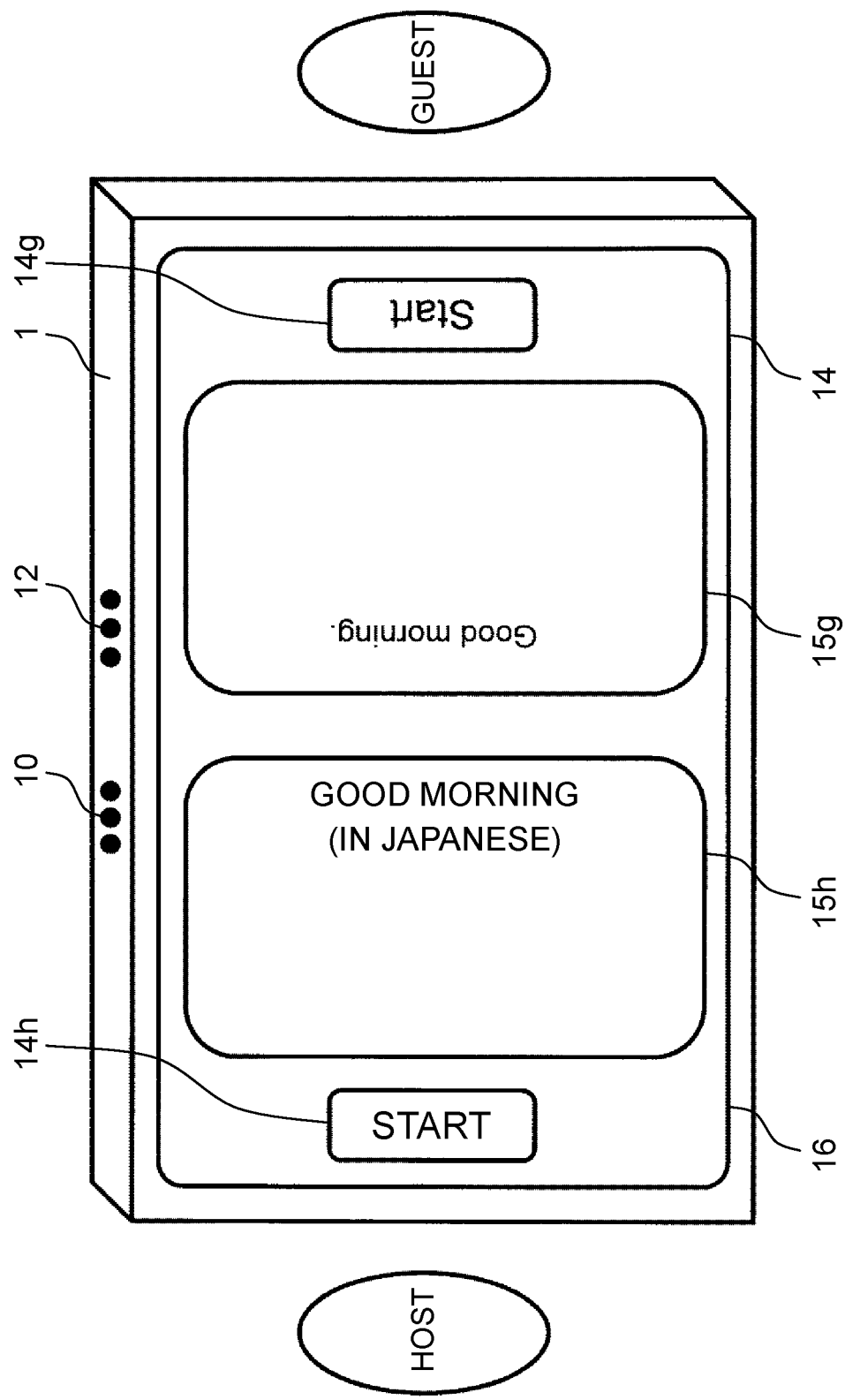
FIG. 1 is an outer appearance view of a translation device according to first and second exemplary embodiments.

The present specification provides definition of terms as follows.

"original language": language of original sentence

"translation language": language of translation sentence

"target language": language of displayed translation sentence (language spoken by guest)

"different language": language of translation sentence not displayed (translation language other than target language)

"intended reverse translation sentence": reverse translation sentence generated by reverse translation of translation sentence in target language into original language "unintended reverse translation sentence": reverse translation sentence generated by reverse translation of translation sentence in different language into original language (Knowledge Configuring Base of the Present Disclosure)

Machine translation from a first language into a second language is executed in accordance with a translation model obtained through learning with reference to a bilingual corpus between the first language and the second language. This bilingual corpus is generated for each pair of parallel translation languages. Translation from Japanese into English and reverse translation from English into Japanese are thus executed in accordance with a translation model obtained through learning with reference to a bilingual corpus between Japanese and English. Translation from Japanese into Chinese and reverse translation from Chinese into Japanese are executed in accordance with a translation model obtained through learning with reference to a bilingual corpus between Japanese and Chinese. Machine translation in accordance with the translation model achieves lower accuracy as sentences in the first language and the second language have a larger difference in construction. Bilingual corpora in some languages may already include new terms whereas bilingual corpora in other languages may not yet include such new terms. The bilingual corpus referred to for learning of the translation model includes translation sentences that are generated by a plurality of persons and thus have ununiform translation quality. These have conventionally led to variation in translation accuracy among languages.

The present disclosure provides a translation device achieving accurate translation regardless of language types. Specifically, the present disclosure enables output of a translation sentence, even in a language exhibiting lower translation accuracy than other languages, with accuracy as high as accuracy of the other languages. Specifically, the translation device according to the present disclosure is configured to generate a translation sentence obtained by translation of an original sentence into a target language, and generate a reverse translation sentence (intended reverse translation sentence) from the translation sentence. The translation device is further configured to generate a translation sentence obtained by translation of the original sentence into a different language, and generate a reverse translation sentence (unintended reverse translation sentence) from the translation sentence. When the intended reverse translation sentence has low accuracy, the translation device generates again a translation sentence in the target language from the unintended reverse translation sentence having high accuracy. This configuration enables output of a correct translation sentence even in a case where translation into the target language has poor accuracy.

First Exemplary Embodiment

The first exemplary embodiment will be described below with reference to the drawings.
1. Configuration
1-1. Outer Appearance of Translation Device FIG. 1 is an outer appearance view of the translation device according to the present exemplary embodiment. FIG. 1 depicts translation device 1 of a tablet type configured to translate conversation between two users who speak different languages. Translation device 1 is configured to execute translation from a first language into a second language (translation language) as well as translation from the second language into the first language. The present exemplary embodiment will be described below assuming that translation device 1 translates face-to-face conversation between a host (e.g. guide) speaking the first language and a guest (e.g. traveler) speaking the second language. The present exemplary embodiment adopts Japanese as the first language spoken by the host.

Translation device 1 includes microphone 10, speaker unit 12, display 14, and touch panel 16. Microphone 10 and speaker unit 12 are exemplarily disposed near openings in a side surface of translation device 1. Display 14 and touch panel 16 are disposed on a primary surface of translation device 1. Display 14 has an area adjacent to the host and near a first end in a longitudinal direction, and the area includes utterance icon 14*h* and display area 15*h*. Display 14 has an area adjacent to the guest and near a second end in the longitudinal direction, and the area includes utterance icon 14*g* and display area 15*g*. Utterance icons 14*h*, 14*g* accept touch operation by the users.

Utterance icon 14*h* is an operation icon operated by the host to specify start and end points of utterance when the host gives the utterance, in other words, when the host inputs utterance in the first language to translation device 1. Utterance icon 14*g* is an operation icon operated by the guest to specify start and end points of utterance when the guest gives the utterance, in other words, when the guest inputs utterance in the second language. Display areas 15*h*, 15*g* are provided for display of an original sentence, a translation sentence, a reverse translation sentence, or the like in the form of a character string.

1-2. Configurations of Translation Device and Server

Figure 2:
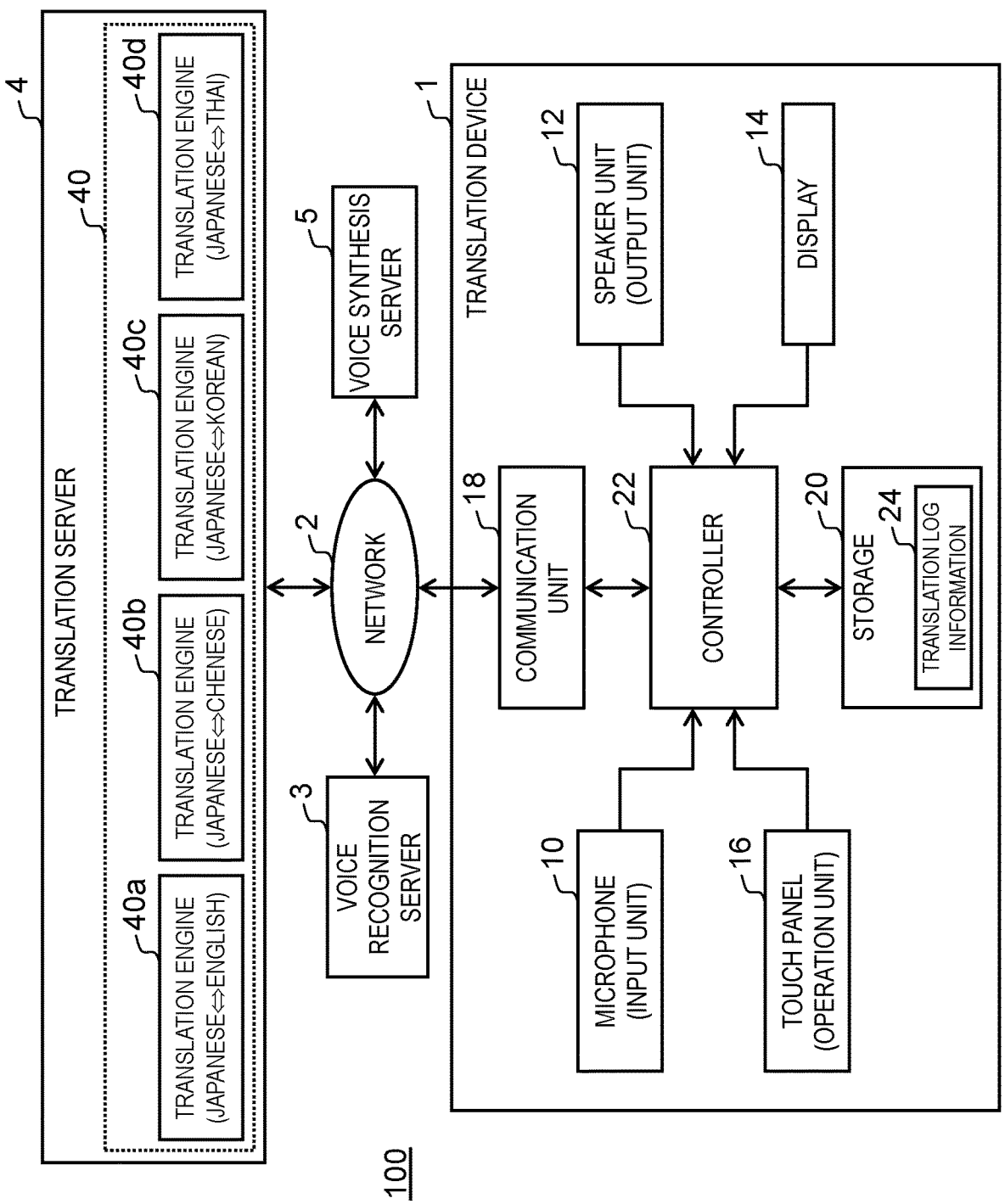
FIG. 2 is a block diagram depicting an electric configuration of a translation system according to the first and second exemplary embodiments.

FIG. 2 is a block diagram depicting an electric configuration of a translation system according to the present exemplary embodiment. The present disclosure provides translation system 100 including translation device 1 depicted in FIG. 1, voice recognition server 3, translation server 4, and voice synthesis server 5. Translation device 1 executes data communication with voice recognition server 3, translation server 4, and voice synthesis server 5, via network 2 like the Internet.

Voice recognition server 3 receives digital voice data from translation device 1 via network 2 and executes voice recognition of the digital voice data thus received to generate text data of an original sentence (voice recognition data in the form of a character string).

Translation server 4 is equipped with a plurality of translation engines 40. Translation server 4 according to the present exemplary embodiment includes translation engines 40*a*, 40*b*, 40*c*, 40*d*. Translation engine 40*a* executes translation from Japanese into English and reverse translation from English into Japanese in accordance with a translation model obtained through learning with reference to a bilingual corpus between Japanese and English. Translation engine 40*b* executes translation from Japanese into Chinese and reverse translation from Chinese into Japanese in accordance with a translation model obtained through learning with reference to a bilingual corpus between Japanese and Chinese. Translation engine 40*c* executes translation from Japanese into Korean and reverse translation from Korean into Japanese in accordance with a translation model obtained through learning with reference to a bilingual corpus between Japanese and Korean. Translation engine 40*d* executes translation from Japanese into Thai and reverse translation from Thai into Japanese in accordance with a translation model obtained through learning with reference to a bilingual corpus between Japanese and Thai. Translation server 4 is equipped with the plurality of translation engines 40*a*, 40*b*, 40*c*, 40*d* for achievement of translation from Japanese into the plurality of languages. Translation engine 40*a*, 40*b*, 40*c*, 40*d* according to the present application will be referred to as translation engine 40 in a case where translation engines 40*a*, 40*b*, 40*c*, 40*d* are not particularly distinguished from one another. When translation server 4 receives the text data of the original sentence from translation device 1 via network 2, translation engine 40 generates text data of a translation sentence (translation data in the form of a character string) from the text data of the original sentence thus received. When translation server 4 receives the text data of the translation sentence from translation device 1 via network 2, translation engine 40 generates text data of a reverse translation sentence (reverse translation data in the form of a character string) obtained by reverse translation of the text data of the translation sentence thus received.

Voice synthesis server 5 receives the text data of the translation sentence from translation device 1 via network 2 and executes voice synthesis of the text data of the translation sentence thus received to generate a voice signal.

Translation device 1 includes microphone 10, speaker unit 12, display 14, touch panel 16, as well as communication unit 18, storage 20, and controller 22.

Microphone 10 is a device configured to convert voice to digital voice data. Specifically, microphone 10 converts voice in a voice signal (analog electric signal), and further converts the voice signal to digital voice data with use of an AD converter. Microphone 10 exemplarily embodies an input unit used for input of an original sentence to translation device 1. The input unit is not limited to microphone 10, but may include a keyboard, a button, a switch, a camera, or any combination thereof. Examples of the original sentence include a sentence according to utterance (voice) and a sentence directly input via the input unit.

Communication unit 18 is a communication module configured to execute data communication with voice recognition server 3, translation server 4, and voice synthesis server 5 via network 2 in accordance with a communication system such as Bluetooth (registered trademark), Wi-Fi (registered trademark), 3G, long term evolution (LTE) (registered trademark), or the institute of electrical and electronics engineers (IEEE) 802.11.

Storage 20 is a recording medium including a flash memory, a ferroelectric memory, a hard disk drive (HDD), a solid state drive (SSD), a random access memory (RAM), or any combination thereof. Storage 20 stores digital voice data, text data of an original sentence, text data of a translation sentence, and text data of a reverse translation sentence. Storage 20 also stores various programs for controller 22.

Controller 22 includes a central processing unit (CPU), a micro processing unit (MPU), or the like and executes the various programs stored in storage 20 to control entire behavior of translation device 1. Controller 22 reads out data or a program stored in storage 20 and executes various calculation processing for achievement of a predetermined function. The function of controller 22 according to the present exemplary embodiment is achieved through cooperation between hardware and software. Controller 22 may alternatively be embodied only with a hardware circuit dedicatedly designed for achievement of a predetermined function. Specifically, controller 22 may include, the CPU or the MPU, alternatively a digital signal processor (DSP), a field-programmable gate array (FPGA), an application specific integrated circuit (ASIC), or the like.

Speaker unit 12 is configured to convert an electric signal to voice. Speaker unit 12 outputs voice according to the voice signal (electric signal) transmitted from controller 22. Speaker unit 12 exemplarily embodies an output unit used for output of voice or text indicating a translation result.

Display 14 is configured to display an image, and is configured by a liquid crystal display device or an organic electroluminescence (EL) display device. Display 14 displays, in display area 15h, 15g, an image indicated by text data of an original sentence, text data of a translation sentence, or text data of a reverse translation sentence transmitted from controller 22. Display 14 exemplarily embodies a display configured to present, to the host or the guest, the text data of the original sentence, the text data of the translation sentence, or the text data of the reverse translation sentence. Display 14 also displays utterance icons 14h, 14g mentioned above.

Touch panel 16 exemplarily embodies an operation unit to be operated by the user and accepts a command from the user. Touch panel 16 is superimposed on display 14. The operation unit in translation device 1 is not limited to touch panel 16, but may include a keyboard, a button, a switch, a camera, or any combination thereof. Touch panel 16 may replace microphone 10 to function as the input unit used for input of an original sentence to translation device 1.

2. Behavior 2-1. Outlined Translation and Reverse Translation

Figure 3:
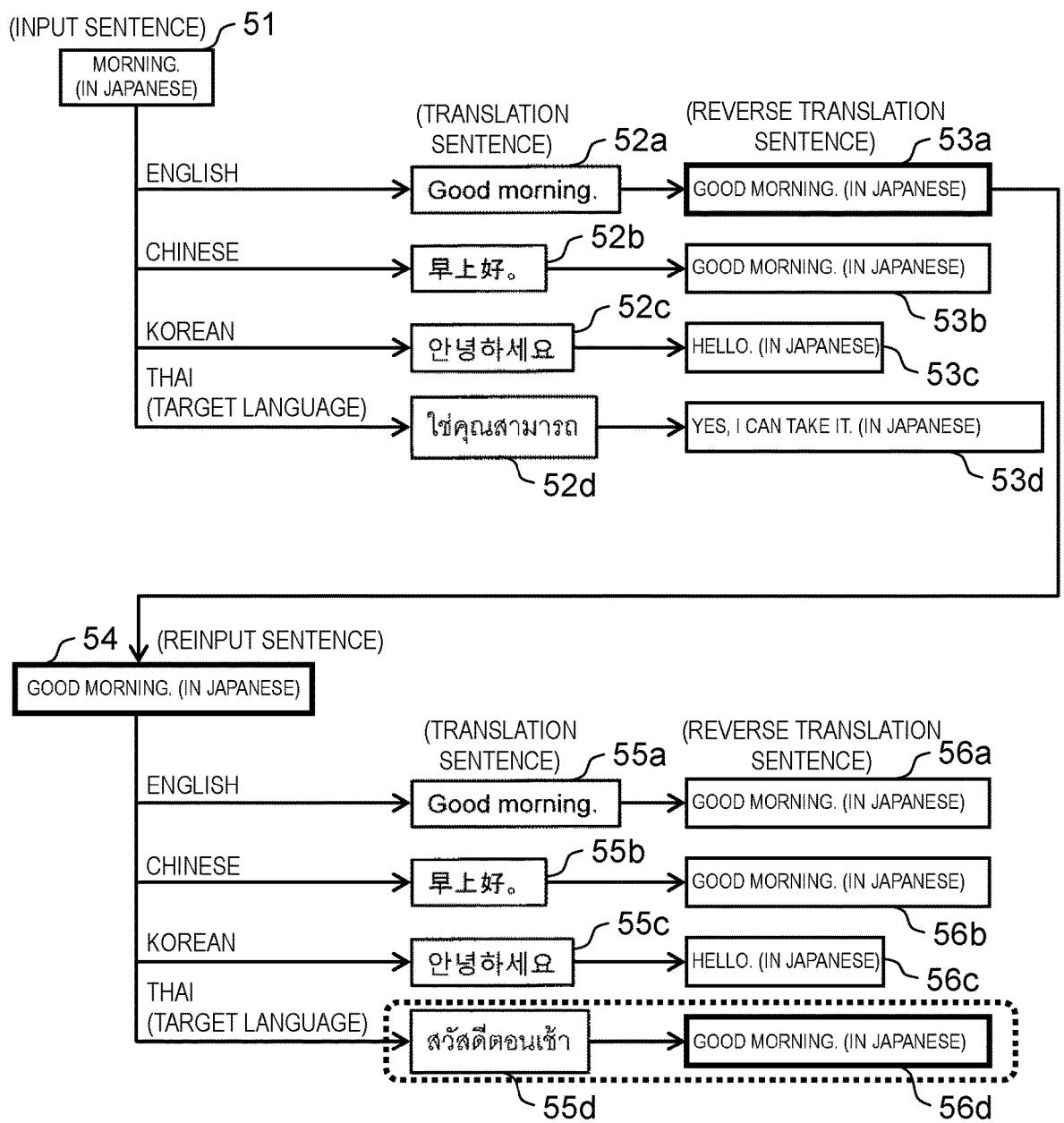
FIG. 3 is a view specifically exemplifying translation and reverse translation according to the first exemplary embodiment.
Figure 4:
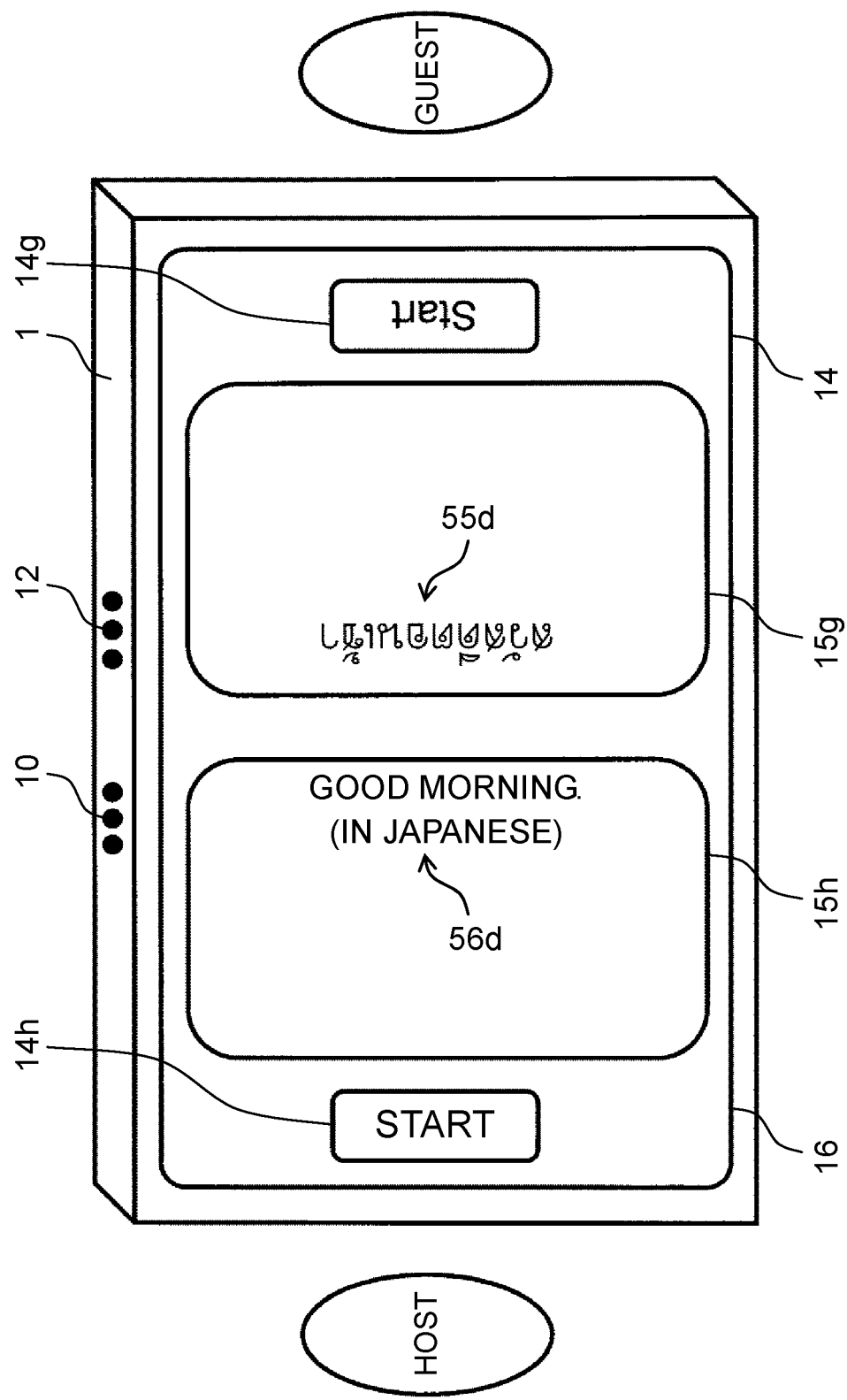
FIG. 4 is a view exemplifying a display screen of a translation sentence and a reverse translation sentence according to the first exemplary embodiment.

Outlined translation and reverse translation will be described with reference to FIG. 3 and FIG. 4. FIG. 3 exemplifies translation and reverse translation in a case where the target language (a language spoken by the guest) is Thai. FIG. 4 exemplifies display of a translation sentence and a reverse translation sentence obtained through retranslation processing. The present exemplary embodiment includes repeated translation of an unintended reverse translation sentence until an intended reverse translation sentence becomes similar to an input sentence or a reinput sentence.

As depicted in FIG. 3, when the host speaks "Morning" in Japanese, translation system 100 translates input sentence 51 (original sentence) "Morning" into Thai as the target language, as well as into different languages including English, Chinese, and Korean. Translation system 100 executes reverse translation of translation sentence 52d in Thai into Japanese as the original language to generate intended reverse translation sentence 53d. Translation system 100 executes reverse translation of translation sentences 52a, 52b, 52c in English, Chinese, and Korean to generate unintended reverse translation sentences 53a, 53b, 53c. FIG. 3 exemplifies intended reverse translation sentence 53d "Yes, I can take it (in Japanese)", and unintended reverse translation sentence 53a, 53b "Good morning (in Japanese)" generated from the translation sentences in English and Chinese. Intended reverse translation sentence 53d "Yes, I can take it (in Japanese)" is not similar to input sentence 51 "Morning (in Japanese)". In contrast, unintended reverse translation sentences 53a, 53b "Good morning (in Japanese)" are similar to input sentence 51 "Morning (in Japanese)". This indicates that translation sentence 52d in Thai is highly possibly incorrect. Translation system 100 thus executes translation again.

Translation system 100 newly generates translation sentences 55a, 55b, 55c in English, Chinese, and Korean, as well as translation sentence 55d in Thai, from unintended reverse translation sentence 53a or unintended reverse translation sentence 53b "Good morning (in Japanese)", which is similar to the input sentence and serves as reinput sentence 54. Translation system 100 then newly generates intended reverse translation sentence 56d from translation sentence 55d in Thai, and newly generates unintended reverse translation sentences 56a, 56b, 56c from translation sentences 55a, 55b, 55c in English, Chinese, and Korean. FIG. 3 exemplifies newly generated intended reverse translation sentence 56d "Good morning (in Japanese)". Intended reverse translation 56d "Good Morning (in Japanese)" is similar to reinput sentence 54 "Good Morning (in Japanese)" substantially equally to unintended reverse translation sentences 56a, 56b "Good morning (in Japanese)" generated from translation sentences 55a, 55b in English and Chinese. Intended reverse translation 56d "Good Morning (in Japanese)" is more similar to reinput sentence 54 "Good Morning (in Japanese)" than unintended reverse translation sentences 56c "Hello (in Japanese)" generated from translation sentence 55c in Korean. This indicates that translation sentence 55d in Thai is correct. Translation device 1 thus displays, on display 14, translation sentence 55d in Thai obtained by translation of reinput sentence 54 "Good morning (in Japanese)" and intended reverse translation sentence 56d corresponding to translation sentence 55d. As exemplarily depicted in FIG. 4, translation device 1 displays translation sentence 55d in Thai as the target language in display area 15g adjacent to the guest and displays intended reverse translation sentence 56d in display area 15h adjacent to the host.

2-2. Translation Processing

Figure 5:
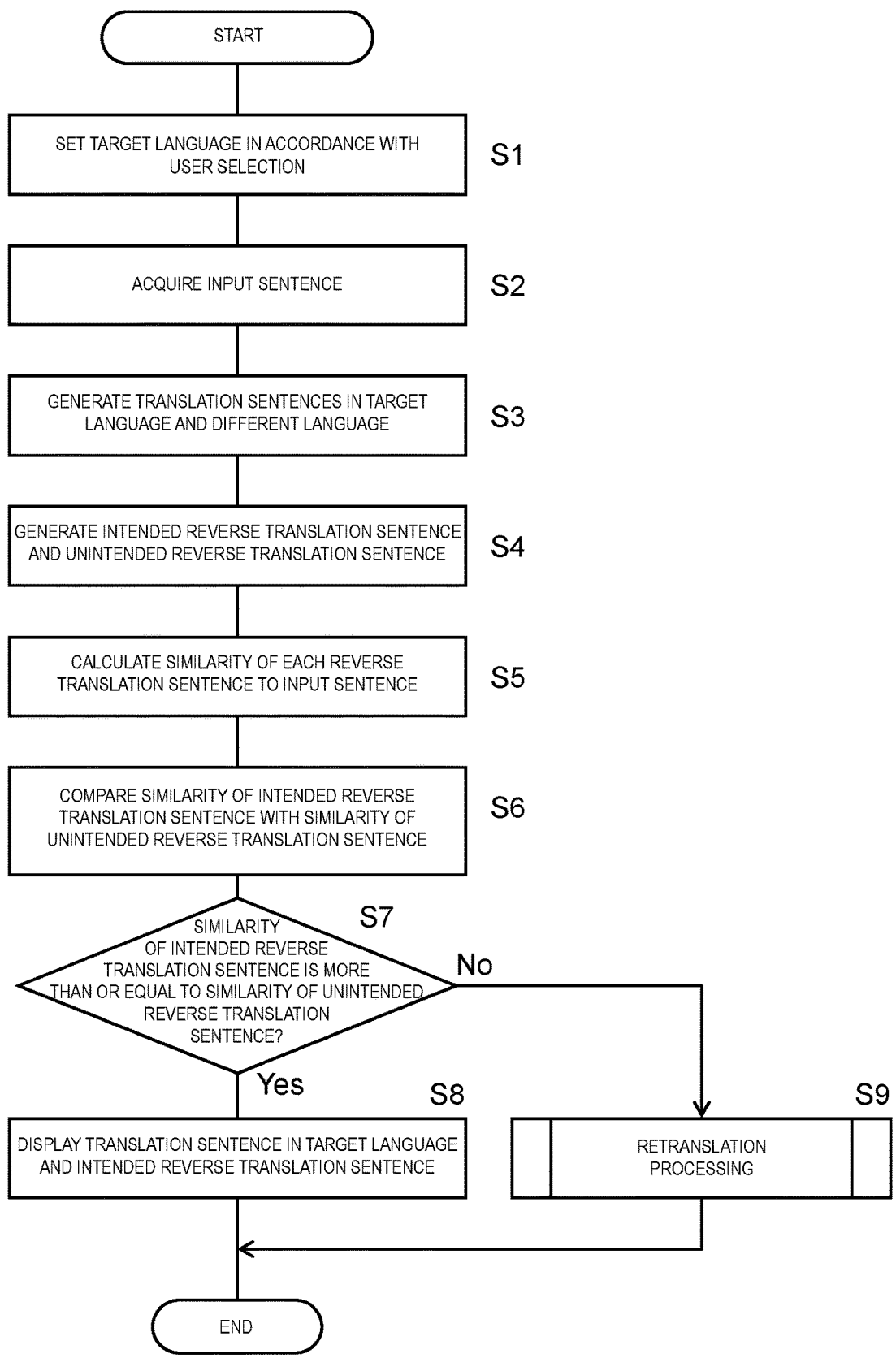
FIG. 5 is a flowchart of translation processing according to the first and second exemplary embodiments.
Figure 6:
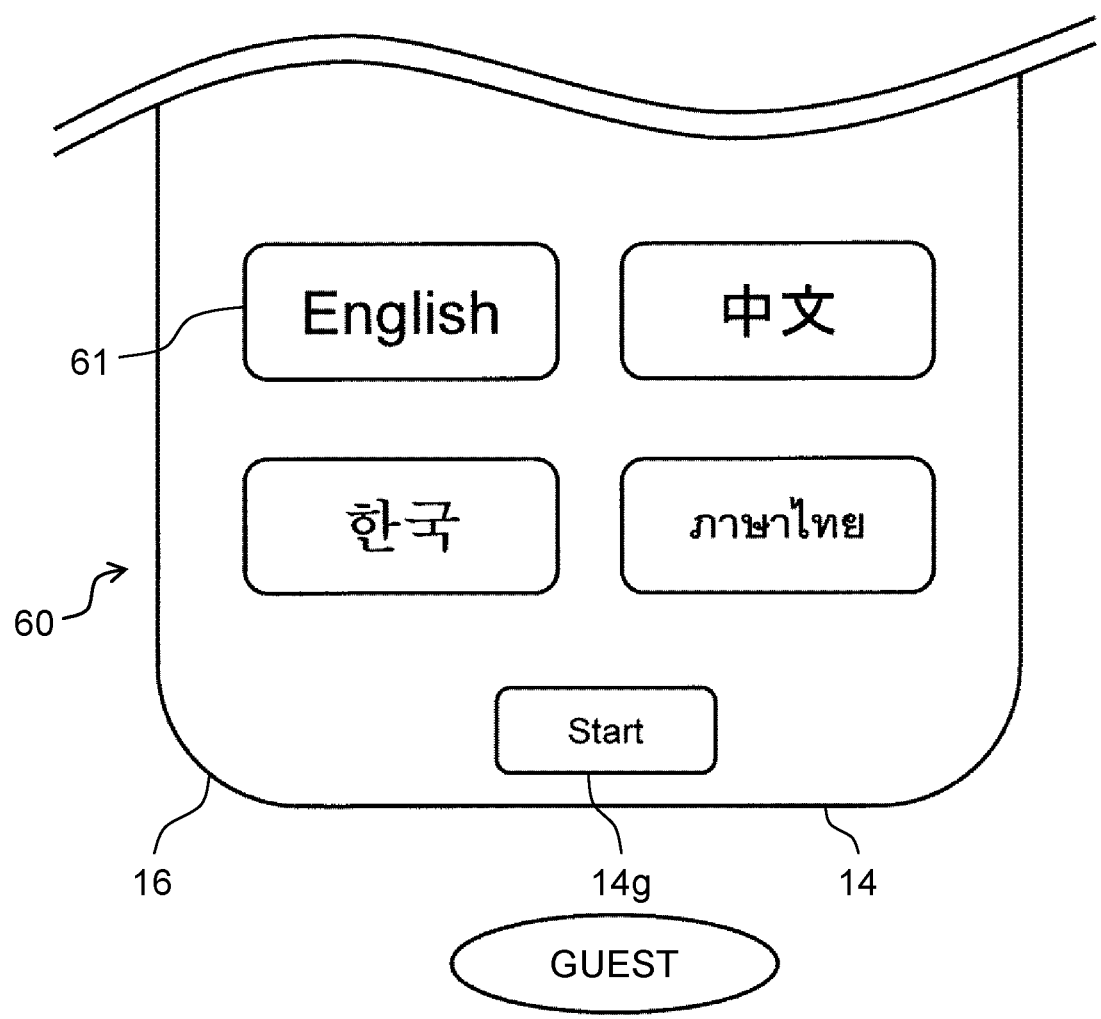
FIG. 6 is a view exemplifying a selection screen of a target language (a language spoken by a guest)
Figure 7:
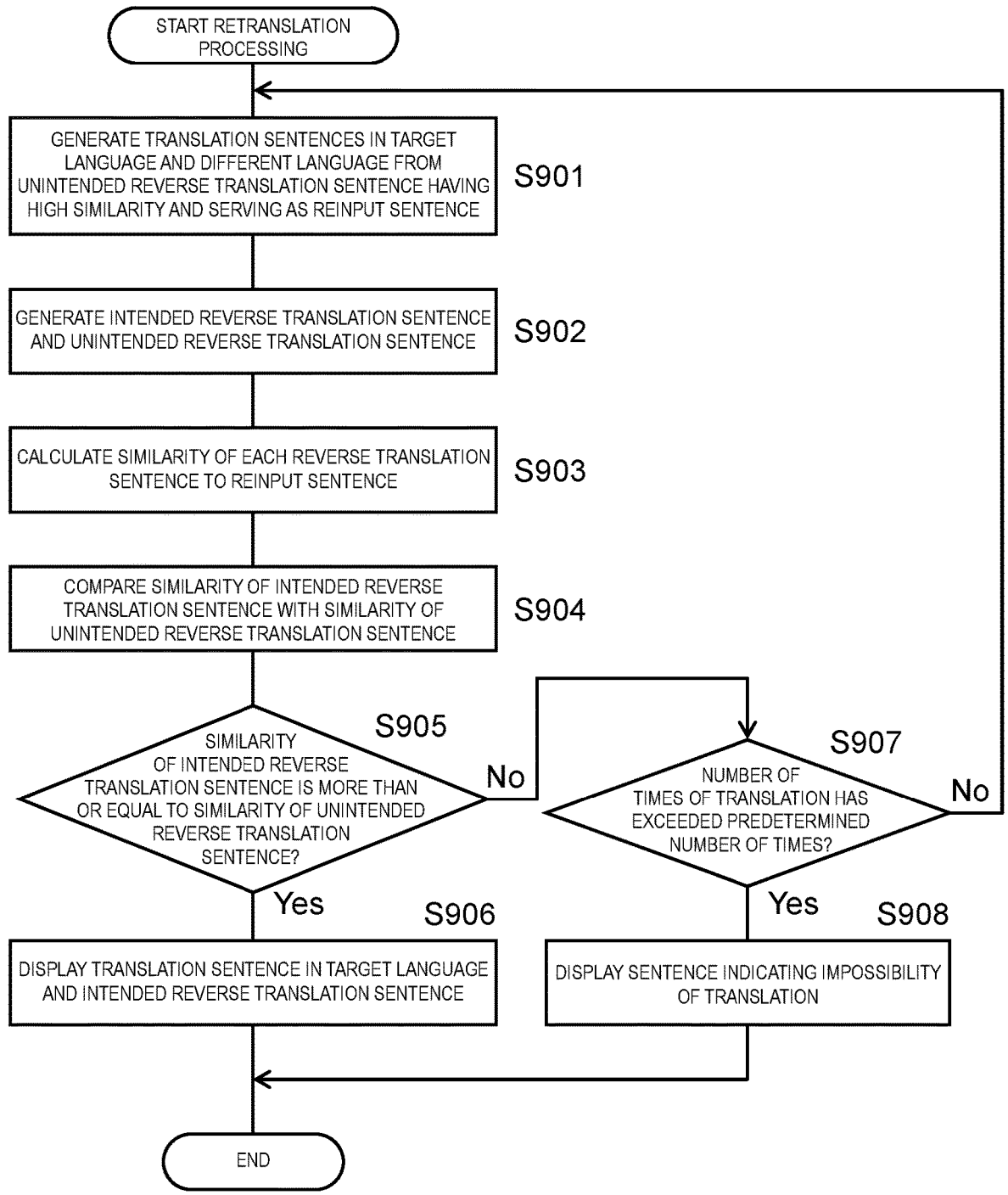
FIG. 7 is a flowchart of retranslation processing according to the first exemplary embodiment.

Behavior of translation system 100 will be described with reference to FIG. 5 to FIG. 7. FIG. 5 depicts behavior of translation processing executed by controller 22 in translation device 1. FIG. 6 is a view exemplifying selection screen 60 for the target language (a language spoken by the guest). FIG. 7 depicts retranslation processing (details of step S9 in FIG. 5) executed by controller 22 in translation device 1.

With reference to FIG. 5, controller 22 in translation device 1 initially sets a target language in accordance with selection by the user (S1). As depicted in FIG. 6, translation device 1 displays, on display 14, language selection icons 61 for selection of the language spoken by the guest before the host and guest start conversation, for example. Languages selectable with use of language selection icons 61 are dependent on the languages to be translated by translation engines 40a, 40b, 40c, 40d. Prior to conversation, the guest touches an appropriate one of language selection icons 61 to select the language spoken by the guest. Controller 22 sets the target language in accordance with language selection icon 61 having been touched. In an exemplary case where the guest touches language selection icon 61 for English, controller 22 sets English as the target language.

Controller 22 acquires an input sentence (original sentence) (S2). Specifically, controller 22 receives digital voice data indicating utterance (voice) of the host via microphone 10. Controller 22 transmits the digital voice data to voice recognition server 3 via network 2. Voice recognition server 3 executes voice recognition of the digital voice data thus received to generate text data of the original sentence as a spoken sentence. Controller 22 receives the text data of the original sentence from voice recognition server 3 via network 2.

Controller 22 generates translation sentences in the target language and the different languages from the original sentence serving as the input sentence (S3). Specifically, controller 22 transmits the text data of the input sentence (original sentence) to translation server 4 via network 2. Translation server 4 causes translation engines 40a, 40b, 40c, 40d to generate text data of translation sentences from the text data of the original sentence thus received. Translation server 4 transmits the text data of the translation sentences to translation device 1 via network 2. Translation device 1 receives the text data of the translation sentences from translation server 4 via network 2.

Controller 22 translates the translation sentences into the original language to generate reverse translation sentences (S4). In this case, controller 22 generates an intended reverse translation sentence from the translation sentence in the target language, and unintended reverse translation sentences from the translation sentences in the different languages. Specifically, controller 22 transmits the text data of the translation sentences to translation server 4 via network 2. Translation server 4 causes translation engines 40a, 40b, 40c, 40d to generate text data of reverse translation sentences from the text data of the translation sentences. Translation server 4 transmits the text data of the reverse translation sentences to translation device 1 via network 2. Translation device 1 receives the text data of the reverse translation sentences from translation server 4 via network 2.

Controller 22 calculates similarity between the input sentence and each of the reverse translation sentences (S5). Controller 22 calculates the similarity in accordance with a technique such as Word2vec, neural network, or Levenshtein distance. Controller 22 compares the similarity between the intended reverse translation sentence and the input sentence with the similarity between each of the unintended reverse translation sentences and the input sentence (S6).

Controller 22 determines whether the similarity between the intended reverse translation sentence and the input sentence is more than or equal to the similarity between each of the unintended reverse translation sentences and the input sentence (S7). In this case, controller 22 compares the similarity of the intended reverse translation sentence with the similarity of each of the unintended reverse translation sentences. FIG. 3 exemplifies the case where controller 22 compares similarity of intended reverse translation sentence 53d generated from translation sentence 52d in Thai with similarity of each of unintended reverse translation sentences 53a, 53b, 53c generated from translation sentences 52a, 52b, 52c in English, Chinese, and Korean. If the similarity of the intended reverse translation sentence is more than or equal to the similarity of each of the unintended reverse translation sentences (Yes in S7), controller 22 outputs the translation sentence in the target language and the intended reverse translation sentence (S8). For example, controller 22 displays the translation sentence in the target language in display area 15g adjacent to the guest and displays the intended reverse translation sentence in display area 15h adjacent to the host. Controller 22 may output voice indicating a translation sentence upon displaying the translation sentence. In this case, controller 22 transmits the text data of the translation sentences to voice synthesis server 5 via network 2. Voice synthesis server 5 executes voice synthesis in accordance with the text data of each of the translation sentences received from translation device 1 to generate a voice signal. Voice synthesis server 5 transmits the voice signal to translation device 1 via network 2. Controller 22 outputs, from speaker unit 12, voice indicating a translation result in accordance with the voice signal received from voice synthesis server 5.

If the similarity of the intended reverse translation sentence is less than the similarity of each of the unintended reverse translation sentences (No in S7), controller 22 executes retranslation processing (S9). Specifically, if at least one of the unintended reverse translation sentences has similarity higher than the similarity of the intended reverse translation sentence, controller 22 executes the retranslation processing.

2-3. Retranslation Processing

The retranslation processing (details of step S9 in FIG. 5) will be described with reference to FIG. 7. Controller 22 newly generates translation sentences in the target language and the different languages (S901). Controller 22 compares the similarity of the intended reverse translation sentence to the input sentence with the similarity of each of the unintended reverse translation sentences to the input sentence. Controller 22 regards, as a reinput sentence, the unintended reverse translation sentence having similarity higher than the similarity of the intended reverse translation sentence. For example, controller 22 regards, as the reinput sentence, the unintended reverse translation sentence having the highest similarity. Generation of a translation sentence from a reinput sentence is executed in accordance with a method identical with the method of generating a translation sentence from an input sentence (step S3 in FIG. 5). Specifically, controller 22 transmits text data of the reinput sentence to translation server 4 to acquire text data of translation sentences from translation server 4.

Controller 22 newly generates an intended reverse translation sentence from the translation sentence in the target language, and newly generates unintended reverse translation sentences from the translation sentences in the different languages (S902). Generation of a reverse translation sentence in the retranslation processing is executed in accordance with a method identical with the method of generating a reverse translation sentence in the translation processing (step S4 in FIG. 5). Specifically, controller 22 transmits the text data of the translation sentences to translation server 4 to acquire text data of the reverse translation sentences from translation server 4.

Controller 22 calculates similarity between the reinput sentence and each of the reverse translation sentences (S903). Controller 22 calculates the similarity in accordance with a technique such as Word2vec, neural network, or Levenshtein distance, as in step S5 in FIG. 5. Controller 22 compares the similarity between the intended reverse translation sentence and the reinput sentence with the similarity between each of the unintended reverse translation sentences and the reinput sentence (S904). Controller 22 determines whether the similarity between the intended reverse translation sentence and the reinput sentence is more than or equal to the similarity between each of the unintended reverse translation sentences and the reinput sentence (S905).

If the similarity of the intended reverse translation sentence is more than or equal to the similarity of each of the unintended reverse translation sentences (Yes in S905), controller 22 displays the translation sentence in the target language and the intended reverse translation sentence (S906). As exemplarily depicted in FIG. 4, controller 22 displays translation sentence 55d in the target language in display area 15g adjacent to the guest and displays intended reverse translation sentence 56d in display area 15h adjacent to the host. If the similarity of the intended reverse translation sentence is less than the similarity of each of the unintended reverse translation sentences (No in S905), in other words, if at least one of the unintended reverse translation sentences has similarity more than the similarity of the intended reverse translation sentence, controller 22 determines whether or not the number of times of translation has exceeded a predetermined number of times (S907). If the number of times of translation has not yet exceeded the predetermined number of times (No in S907), controller 22 returns to step S901 to repeat generation of translation sentences and reverse translation sentences from, as a new reinput sentence, the unintended reverse translation sentence having similarity to the reinput sentence higher than the similarity of the intended reverse translation sentence.

If the number of times of translation has exceeded the predetermined number of times (Yes in S907), controller 22 displays, on display 14, a sentence indicating impossibility of translation (S908). For example, controller 22 displays the sentence indicating impossibility of translation in display area 15h adjacent to the host.

3. Effects, Supplementals, Etc.

Translation device 1 according to the present exemplary embodiment includes microphone 10 (exemplifying the input unit) configured to receive input of an original sentence in an original language, controller 22 configured to generate a translation sentence (first translation sentence) obtained by translation of the original sentence as an input sentence into a target language (first language), and display 14 (exemplifying the display) configured to display the translation sentence. Controller 22 generates a translation sentence (second translation sentence) obtained by translation of the input sentence into at least one language (second language) different from the target language, an intended reverse translation sentence (first reverse translation sentence) obtained by reverse translation of the translation sentence in the target language into the original language, and an unintended reverse translation sentence (second reverse translation sentence) obtained by reverse translation of the translation sentence in the different language into the original language. Controller 22 calculates similarity (first similarity) between the intended reverse translation sentence and the input sentence (S5). Controller 22 determines, in accordance with the similarity, whether to display the translation sentence in the target language on display 14 or to newly generate a translation sentence (third translation sentence) obtained by translation of the unintended reverse translation sentence as a reinput sentence into the target language (S6, S7).

Specifically, controller 22 calculates similarity (second similarity) between the unintended reverse translation sentence and the input sentence, and displays, on display 14, the translation sentence in the target language if the similarity between the intended reverse translation sentence and the input sentence is more than or equal to the similarity between the unintended reverse translation sentence and the input sentence. If the similarity between the intended reverse translation sentence and the input sentence is less than the similarity between the unintended reverse translation sentence and the input sentence, controller 22 newly generates a translation sentence (third translation sentence) obtained by translation of the unintended reverse translation sentence as a reinput sentence into the target language.

If translation into the target language has low accuracy, a translation sentence is to be newly generated from the unintended reverse translation sentence that is generated from the translation sentence in the different language having high translation accuracy. This enables output of a highly accurate translation sentence. Accurate translation is thus achieved regardless of the type of language. The unintended reverse translation sentence is generated by translation engine 40 and is thus more appropriate for translation than the original sentence. The unintended reverse translation sentence is to be translated more accurately than the original sentence. Retranslation of the unintended reverse translation sentence reduces the number of times of repeated utterance or repeated input by the user.

The configuration further achieves the following effects. The present exemplary embodiment achieves higher translation accuracy with a larger number of different translation languages. The translation sentence in the target language is generated from the unintended reverse translation sentence, so that accurate translation is achieved with reference to the bilingual corpus in the different language even in a case where the bilingual corpus in the target language does not include a new term. Accurate translation is enabled without addition of the new term to every bilingual corpus, which leads to reduction in cost for preparation of the bilingual corpora. A language exhibiting low translation accuracy can be specified in accordance with the number of times of repeated translation. This leads to more efficient improvement of the translation model. An incorrectly translated sentence can be specified for every language. This also leads to more efficient improvement of the translation model.

Furthermore, controller 22 newly generates a translation sentence (fourth translation sentence) obtained by translation of the reinput sentence into at least one different language. Controller 22 newly generates an intended reverse translation sentence (third reverse translation sentence) obtained by reverse translation of the newly generated translation sentence in the target language into the original language, and an unintended reverse translation sentence (exemplifying a fourth reverse translation sentence) obtained by reverse translation of the newly generated translation sentence in the different language into the original language. Controller 22 calculates similarity (third similarity) between the newly generated intended reverse translation sentence and the reinput sentence as well as similarity (fourth similarity) between the newly generated unintended reverse translation sentence and the reinput sentence (S903). If the similarity between the intended reverse translation sentence and the reinput sentence is more than or equal to the similarity between the unintended reverse translation sentence and the reinput sentence, controller 22 displays, on display 14, the newly generated translation sentence in the target language. If the similarity between the intended reverse translation sentence and the reinput sentence is less than the similarity between the unintended reverse translation sentence and the reinput sentence, controller 22 repeats generation of a translation sentence in the target language, an intended reverse translation sentence, a translation sentence in the different language, and an unintended reverse translation sentence, from the newly generated unintended reverse translation sentence as the reinput sentence. Specifically, controller 22 generates a translation sentence (fifth translation sentence) obtained by translation of the unintended reverse translation sentence into the target language.

If translation into the target language has poor accuracy, a translation sentence in the target language is repeatedly generated from the unintended reverse translation sentence that is generated from the translation sentence in the different language having high translation accuracy. This enables output of a highly accurate translation sentence.

Figure 8:
FIG. 8 is a chart of exemplary translation log information.

Controller 22 may generate translation log information 24 (exemplifying translation history information) indicating translation records during execution of the translation processing in FIG. 5 and the retranslation processing in FIG. 7, and store translation log information 24 in storage 20. FIG. 8 depicts exemplary translation log information 24. Translation log information 24 exemplarily includes all or at least one of the original sentence (input sentence), the number of times of translation, the reinput sentence, the translation sentence in the target language, the intended reverse translation sentence, similarity between the intended reverse translation sentence and the input sentence (or the reinput sentence), the translation sentence in the different language, the unintended reverse translation sentence, and similarity between the unintended reverse translation sentence and the input sentence (or the reinput sentence). Controller 22 may determine the reinput sentence with reference to translation log information 24.

Second Exemplary Embodiment

The present exemplary embodiment enables output of a correct translation sentence even in a case where a language includes a polyseme. In such a language including a polyseme, a single term has a plurality of meanings and an input sentence may not agree with a reverse translation sentence even if translation is executed correctly. For example, Korean has a single greeting term for "Good morning", "Hello", and "Good evening". In this case, as depicted in FIG. 9, even with correct translation sentences 72c, 75c in Korean for input sentence 71 "Morning (in Japanese)" and reinput sentence 74 "Good morning (in Japanese)", reverse translation sentences 73c, 76c may have "Hello (in Japanese)". Repeated translation may thus fail to improve similarity between the reverse translation sentence and the reinput sentence, in which case no translation sentence may be output. The present exemplary embodiment achieves output of any correct translation sentence even in a case where a reverse translation sentence is different from an input sentence or a reinput sentence in a language including a single term having a plurality of meanings. Translation system 100 according to the present exemplary embodiment is configured identically with the translation system in FIG. 2 according to the first exemplary embodiment.

Figure 10:
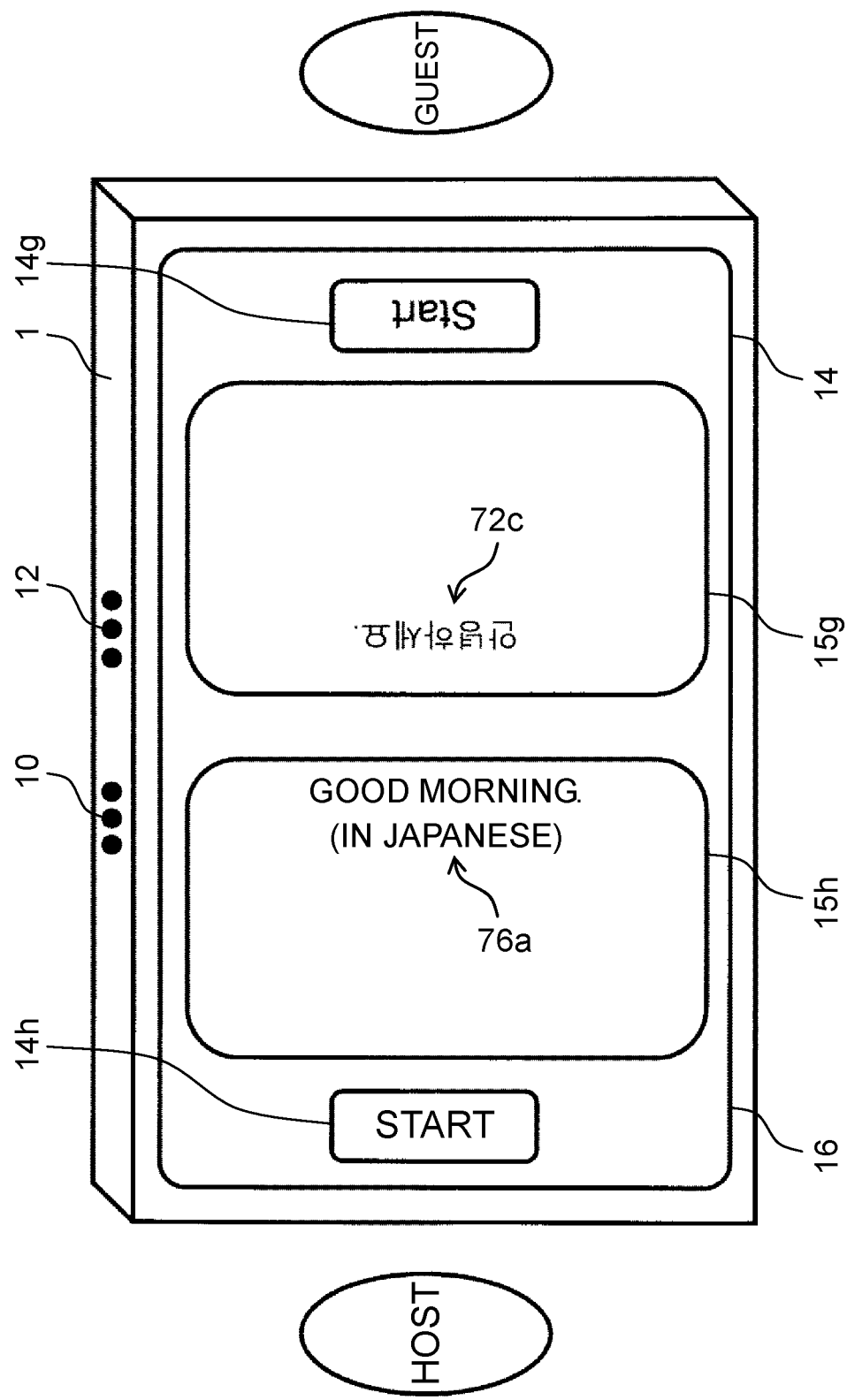
FIG. 10 is a view exemplifying a display screen having a translation sentence and a reverse translation sentence according to the second exemplary embodiment.

Outlined translation and reverse translation according to the second exemplary embodiment will be described with reference to FIG. 9 and FIG. 10. FIG. 9 exemplifies translation and reverse translation in a case where the target language (a language spoken by the guest) is Korean. FIG. 10 depicts an exemplary display screen of a translation sentence and a reverse translation sentence according to the second exemplary embodiment.

As depicted in FIG. 9, when the host speaks "Morning (in Japanese)", translation system 100 translates input sentence 71 (original sentence) "Morning (in Japanese)" into Korean as the target language, as well as into different languages including English, Chinese, and Thai. Translation system 100 further generates intended reverse translation sentence 73c from translation sentence 72c in Korean, and generates unintended reverse translation sentences 73a, 73b, 73d from translation sentences 72a, 72b, 72d in English, Chinese, and Thai. Intended reverse translation sentence 73c "Hello (in Japanese)" and input sentence 71 "Morning (in Japanese)" have similarity less than similarity between each of unintended reverse translation sentences 73a, 73b "Good morning (in Japanese)" and input sentence 71 "Morning". Translation system 100 thus executes translation again.

Translation system 100 newly generates translation sentences 75a, 75b, 75c, 75d in English, Chinese, Korean, and Thai, from unintended reverse translation sentence 73a or unintended reverse translation sentence 73b "Good morning (in Japanese)", which is similar to input sentence 71 and serves as reinput sentence 74. Translation system 100 also generates intended reverse translation sentence 76c from translation sentence 75c in Korean, and newly generates unintended reverse translation sentences 76a, 76b, 76d from translation sentences 75a, 75b, 75d in English, Chinese, and Thai. Intended reverse translation sentence 76c "Hello (in Japanese)" and reinput sentence 74 "Good morning (in Japanese)" have similarity less than similarity between each of unintended reverse translation sentences 76a, 76b, 76d "Good morning (in Japanese)" and reinput sentence 74 "Good morning". However, previous translation sentence 72c and current translation sentence 75c in the target language agree with each other. In this case, translation system 100 determines that translation sentences 72c, 75c in the target language are correct, assuming that a polyseme causes disagreement between intended reverse translation sentence 76c and reinput sentence 74. Translation system 100 thus displays, on display 14, translation sentence 72c (translation sentence 75c) in Korean. Translation system 100 also displays, on display 14, unintended reverse translation sentence 76a, unintended reverse translation sentence 76b, or unintended reverse translation sentence 76d "Good morning (in Japanese)" having high similarity to reinput sentence 74, in place of intended reverse translation sentence 76c. For example, display area 15g for the guest has the translation sentence in Korean as the target language, and display area 15h for the host has the reverse translation sentence from English, Chinese, or Thai "Good morning (in Japanese)" having the highest similarity. As exemplarily depicted in FIG. 10, display area 15g may have translation sentence 72c in Korean and display area 15h may have unintended reverse translation sentence 76a from English. Even in the case where intended reverse translation sentence 76c "Hello (in Japanese)" generated from translation sentence 75c in Korean and reinput sentence 74 "Good morning (in Japanese)" have low similarity, if previously generated translation sentence 72c in Korean is identical with currently generated translation sentence 75c in Korean, translation sentences 72c, 75c are determined as being correct. Translation sentence 72c (translation sentence 75c) is presented on display 14.

Figure 11:
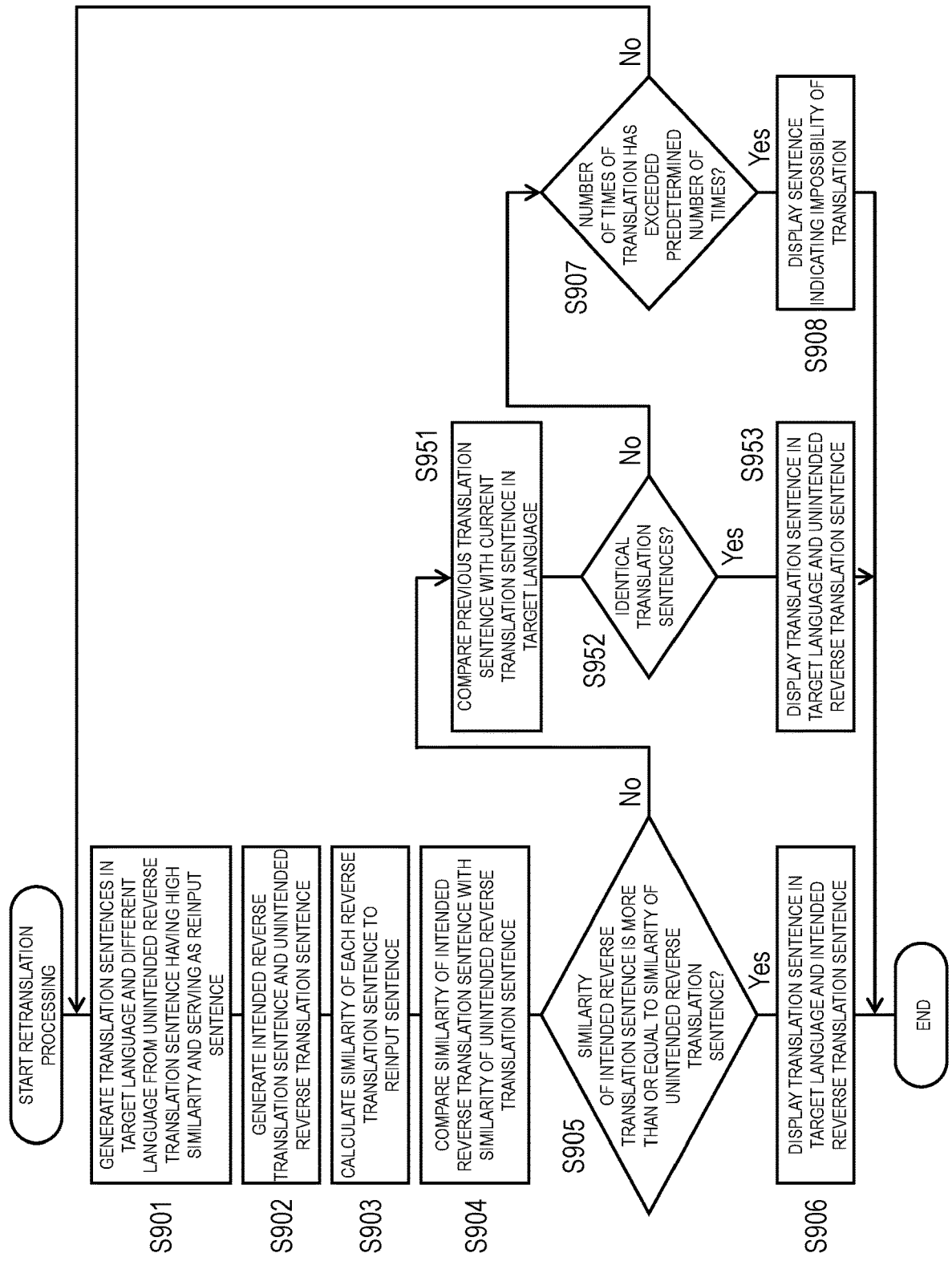
FIG. 11 is a flowchart of retranslation processing according to the second exemplary embodiment.

Translation device 1 will be described in terms of behavior in retranslation processing according to the second exemplary embodiment with reference to FIG. 11. FIG. 11 depicts the retranslation processing (details of step S9 in FIG. 5) according to the second exemplary embodiment.

Step S901 to step S908 in FIG. 11 are identical with step S901 to step S908 in FIG. 7 according to the first exemplary embodiment. FIG. 11 depicts step S951 to step S953 in addition to the steps depicted in FIG. 7. Described below are further added step S951 to step S953.

The process flow according to the present exemplary embodiment proceeds to step S951 if similarity between the intended reverse translation sentence generated from the translation sentence in the target language and the reinput sentence is lower than similarity between the unintended reverse translation sentence generated from the translation sentence in the different language and the reinput sentence (No in S905). Controller 22 compares the previous translation sentence and the current translation sentence in the target language (S951), and determines whether or not the previous translation sentence and the current translation sentence in the target language are identical with each other (S952). If the previous translation sentence and the current translation sentence in the target language are identical with each other (Yes in S952), controller 22 displays the translation sentence in the target language as well as the unintended reverse translation sentence having the highest similarity to the reinput sentence (S953). If the previous translation sentence and the current translation sentence in the target language are different from each other (No in S952), controller 22 determines whether or not the number of times of translation has exceeded a predetermined number of times (S907).

As described above, if the newly generated intended reverse translation sentence (first reverse translation sentence) and the reinput sentence have similarity (third similarity) lower than similarity (fourth similarity) between the newly generated unintended reverse translation sentence (second reverse translation sentence) and the reinput sentence, controller 22 determines whether or not the newly generated translation sentence in the target language is identical with the previously generated translation sentence in the target language (S952). If the newly generated translation sentence in the target language is identical with the previously generated translation sentence in the target language, controller 22 displays, on display 14, the translation sentence in the target language (S953). This achieves accurate output of a translation sentence even when a polyseme is involved.

Controller 22 displays, on display 14, the translation sentence in the target language as well as the unintended reverse translation sentence having similarity to the reinput sentence higher than the similarity of the intended reverse translation sentence. This allows the host to check whether or not the original sentence is translated correctly.

Other Exemplary Embodiments

The exemplary embodiments have been described above to exemplify the techniques disclosed in the present application. The techniques according to the present disclosure are not limited by the exemplary embodiments, and are applicable to other exemplary embodiments achieved through change, replacement, addition, elimination, or the like where appropriate. Such other exemplary embodiments will be described below.

The above exemplary embodiments include step S7 in FIG. 5 and step S905 in FIG. 7 and FIG. 11 of determining whether or not the similarity of the intended reverse translation sentence is more than or equal to the similarity of the unintended reverse translation sentence for display of the translation sentence in the target language or execution of the retranslation processing. Step S7 or step S905 may include different determination. Alternatively, whether or not the similarity of the intended reverse translation sentence is more than a threshold (e.g. a minimum score value) may be determined for execution of the retranslation processing when the similarity is less than or equal to the threshold. Still alternatively, assuming "a first threshold (e.g. the minimum score value)<a second threshold", the retranslation processing may be executed if the similarity of the intended reverse translation sentence is less than or equal to the first threshold and the similarity of the unintended reverse translation sentence is more than or equal to the second threshold. Further alternatively, the retranslation processing may be executed if the similarity of the intended reverse translation sentence is less than or equal to a threshold (e.g. the minimum score value) and the similarity of the intended reverse translation sentence and the similarity of the unintended reverse translation sentence have a difference more than or equal to a predetermined value.

According to the above exemplary embodiments, step S903 in FIG. 7 and FIG. 11 relates to calculation of similarity between the reinput sentence and each reverse translation sentence. Similarity between the input sentence (original sentence) and each reverse translation sentence may alternatively be calculated in addition or in place of this calculation.

The above exemplary embodiments include repeating translation in step S901 in FIG. 7 and FIG. 11 from the unintended reverse translation sentence having similarity to the reinput sentence higher (e.g. highest among the unintended reverse translation sentences) than the similarity of the intended reverse translation sentence. The reinput sentence may be determined according to a different criterion. Alternatively, the reinput sentence may be regarded as the unintended reverse translation sentence generated most recently and having the highest similarity to the original sentence. Still alternatively, the reinput sentence may be selected from the unintended reverse translation sentences generated most recently as well as in the past, to have similarity to the original sentence higher than the similarity of the intended reverse translation sentence.

The above exemplary embodiments include step S907 in FIG. 7 and FIG. 11 of determining whether or not to repeat the retranslation processing in accordance with whether or not the number of times of translation has exceeded the predetermined number of times. This determination may alternatively be made in accordance with a different criterion. For example, determination may be made as to whether or not there is any reverse translation sentence not yet used as a reinput sentence among the unintended reverse translation sentences having similarity to the reinput sentence or the original sentence more than or equal to a threshold, and the retranslation processing may be executed repeatedly if there is any such reverse translation sentence. The selected unintended reverse translation sentence having the similarity to the reinput sentence or the original sentence more than or equal to the threshold is not limited to the currently translated sentences but may be selected from past unintended reverse translation sentences generated in all the translation processing. Determination may be made as to whether or not the similarity of the unintended reverse translation sentence to the reinput sentence or the original sentence is less than similarity of the immediately previous unintended reverse translation sentence, and the retranslation processing may be stopped if the similarity is less than the immediately previous similarity.

If the previous translation sentence and the current translation sentence in the target language are identical with each other in the determination in step S952 in FIG. 11 and the unintended reverse translation sentence and the reinput sentence (or the original sentence) have similarity more than the threshold, the process flow may proceed to step S953 for display of the translation sentence in the target language. If the previous translation sentence and the current translation sentence in the target language are identical with each other and the similarity of the unintended reverse translation sentence to the reinput sentence and the similarity to the original sentence have a difference within a predetermined value, the process flow may proceed to step S953 for display of the translation sentence in the target language.

Translation device 1 according to the above exemplary embodiments is configured to translate an original sentence according to utterance (voice) input via microphone 10. Translation device 1 may alternatively be configured to translate an original sentence not in the form of utterance but input via the keyboard or a mouse, or an original sentence generated in accordance with gesture in a sign language or the like captured with use of a camera.

Translation device 1 according to the above exemplary embodiments is configured to calculate similarity between a reverse translation sentence and an input sentence or a reinput sentence. Such calculation of similarity may alternatively be executed by translation server 4. For example, translation server 4 may generate a translation sentence and a reverse translation sentence from the input sentence or the reinput sentence, calculate similarity, and repeat translation until the similarity of the intended reverse translation sentence exceeds the similarity of the unintended reverse translation sentence. In this case, translation server 4 may transmit the translation sentence in the target language and the intended reverse translation sentence to translation device 1 when the similarity of the intended reverse translation sentence becomes more than or equal to the similarity of the unintended reverse translation sentence. If the number of times of translation exceeds the predetermined number of times before the similarity of the intended reverse translation sentence becomes more than or equal to the similarity of the unintended reverse translation sentence, translation server 4 may transmit information indicating impossibility of translation to translation device 1. Translation device 1 displays, on display 14, the translation sentence in the target language and the intended reverse translation sentence, which are acquired from translation server 4.

In the above exemplary embodiments, voice recognition server 3 executes voice recognition, translation server 4 executes translation, and voice synthesis server 5 executes voice synthesis. However, the present disclosure is not limited to the exemplary embodiments. Translation device 1 can alternatively execute at least one of voice recognition, translation, and voice synthesis. For example, translation device 1 (terminal) may have all the functions of voice recognition server 3, translation server 4, and voice synthesis server 5 to be configured to execute all processing relevant to translation. Translation device 1 may not include communication unit 18 in this case. Voice recognition, translation, and voice synthesis may be executed by one or two servers.

The above exemplary embodiments exemplify the case where there are three different languages. It is required to be at least one different language. Translation server 4 including the plurality of translation engines is configured to execute translation and reverse translation among the plurality of languages. The translation server including a single translation engine may alternatively be configured to execute translation and reverse translation among the plurality of languages.

The above exemplary embodiments exemplify the case where the original language is Japanese and the translation languages include English, Chinese, Korean, and Thai. The original language and the translation languages are not limited to those according to the above exemplary embodiments. Examples of the original language and the translation languages may alternatively include any other language (e.g. German, French, Spanish, Vietnamese, or Indonesian).

(Outline of Exemplary Embodiments)

(1) The translation device according to the present disclosure includes an input unit configured to receive an input sentence in an original language, a controller configured to generate a first translation sentence obtained by translation of the input sentence into a first language, and a display. The controller generates a second translation sentence obtained by translation of the input sentence into a second language different from the first language, a first reverse translation sentence (intended reverse translation sentence) obtained by reverse translation of the first translation sentence into the original language, and a second reverse translation sentence (unintended reverse translation sentence) obtained by reverse translation of the second translation sentence into the original language, and calculates first similarity as similarity between the first reverse translation sentence and the input sentence (S5). The controller determines, in accordance with the first similarity, whether to display the first translation sentence on the display or to generate a third translation sentence obtained by translation of the second reverse translation sentence into the first language (S6, S7).

Translation is executed again from the second reverse translation sentence in accordance with the similarity to the input sentence, to achieve accurate translation regardless of language types.

(2) The controller in the translation device according to (1) may calculate second similarity as similarity between the second reverse translation sentence and the input sentence. The controller may display the first translation sentence on the display if the first similarity is more than or equal to the second similarity, and may generate the third translation sentence if the first similarity is less than the second similarity.

(3) The controller in the translation device according to (2) may generate a fourth translation sentence obtained by translation of the second reverse translation sentence into the second language, a third reverse translation sentence (intended reverse translation sentence) obtained by reverse translation of the third translation sentence into the original language, and a fourth reverse translation sentence (unintended reverse translation sentence) obtained by reverse translation of the fourth translation sentence into the original language. The controller may calculate third similarity as similarity between the third reverse translation sentence and the second reverse translation sentence, and fourth similarity as similarity between the fourth reverse translation sentence and the second reverse translation sentence (S903). The controller may display the third translation sentence on the display if the third similarity is more than or equal to the fourth similarity, and may generate a fifth translation sentence obtained by translation of the fourth reverse translation sentence into the first language if the third similarity is less than the fourth similarity.

Translation is repeated until similarity to the reinput sentence improves, for achievement of accurate translation regardless of language types.

(4) The controller in the translation device according to (2) may generate the fourth translation sentence obtained by translation of the second reverse translation sentence into the second language, the third reverse translation sentence obtained by reverse translation of the third translation sentence into the original language, and the fourth reverse translation sentence obtained by reverse translation of the fourth translation sentence into the original language. The controller may calculate the third similarity as similarity between the third reverse translation sentence and the second reverse translation sentence, and the fourth similarity as similarity between the fourth reverse translation sentence and the second reverse translation sentence. The controller may determine whether or not the third translation sentence is identical with the first translation sentence (S952) if the third similarity is less than the fourth similarity, and may display the first translation sentence on the display if the third translation sentence is identical with the first translation sentence.

This configuration achieves display of an accurate translation sentence even in a case where the target language has a polyseme.

(5) The controller in the translation device according to (4) may display, on the display, the first translation sentence as well as the fourth reverse translation sentence.

This configuration achieves display of a reverse translation sentence appropriate for the input sentence or the reinput sentence even in a case where the target language has a polyseme. This allows the user to find whether or not the translation sentence is correct by checking the reverse translation sentence.

(6) The translation device according to (3) may further include a storage configured to store translation history information including at least one of the input sentence, the first translation sentence, the first reverse translation sentence, the second translation sentence, the second reverse translation sentence, the first similarity to the fourth similarity, and the number of times of repeated translation.

(7) The present disclosure provides a translation method including: receiving an input sentence in an original language at an input unit (S2); generating, at a calculator (controller 22 and translation server 4 included in translation device 1), a first translation sentence obtained by translation of the input sentence into a first language, and a second translation sentence obtained by translation of the input sentence into a second language different from the first language (S3); generating, at the calculator (controller 22 and translation server 4 in translation device 1), a first reverse translation sentence obtained by reverse translation of the first translation sentence into the original language, and a second reverse translation sentence obtained by reverse translation of the second translation sentence into the original language (S4); calculating, at the calculator (controller 22), similarity between the first reverse translation sentence and the input sentence (S5); and determining, at the calculator (controller 22), in accordance with the similarity, whether to display the first translation sentence on a display or to generate a third translation sentence obtained by translation of the second reverse translation sentence into the first language (S6, S7).

The translation device or the translation method recited in appropriate one of the claims of the present disclosure is achieved by cooperation between a program and a hardware resource such as a processor or a memory.

The present disclosure is applicable to a translation device configured to execute translation according to voice of a speaker or an input sentence.

What is claimed is:

1. A translation device comprising:
   an input unit configured to receive an input sentence in an original language;
   a controller configured to generate a first translation sentence obtained by translation of the input sentence into a first language; and
   a display; wherein
   the controller:
      generates a second translation sentence obtained by translation of the input sentence into a second language different from the first language, a first reverse translation sentence obtained by reverse translation of the first translation sentence into the original language, and a second reverse translation sentence obtained by reverse translation of the second translation sentence into the original language,
      calculates first similarity as similarity between the first reverse translation sentence and the input sentence and second similarity as similarity between the second reverse translation sentence and the input sentence,
      displays the first translation sentence on the display when the first similarity is more than or equal to the second similarity,
      generates a third translation sentence obtained by translation of the second reverse translation sentence into the first language when the first similarity is less than the second similarity,
      generates a fourth translation sentence obtained by translation of the second reverse translation sentence into the second language,
      generates a third reverse translation sentence obtained by reverse translation of the third translation sentence into the original language, and a fourth reverse translation sentence obtained by reverse translation of the fourth translation sentence into the original language,
      calculates third similarity as similarity between the third reverse translation sentence and the second reverse translation sentence, and fourth similarity as similarity between the fourth reverse translation sentence and the second reverse translation sentence, and
      displays the third translation sentence on the display when the third similarity is more than or equal to the fourth similarity.

2. The translation device according to claim 1, wherein the controller:
   generates a fifth translation sentence obtained by translation of the fourth reverse translation sentence into the first language when the third similarity is less than the fourth similarity.

3. The translation device according to claim 2, wherein the controller:
   generates a sixth translation sentence obtained by translation of the forth reverse translation sentence into the second language,
   generates a fifth reverse translation sentence obtained by reverse translation of the fifth translation sentence into the original language, and a sixth reverse translation sentence obtained by reverse translation of the sixth translation sentence into the original language,
   calculates fifth similarity as similarity between the fifth reverse translation sentence and the fourth reverse translation sentence, and sixth similarity as similarity between the sixth reverse translation sentence and the fourth reverse translation sentence, and
   displays the fifth translation sentence on the display when the fifth similarity is more than or equal to the sixth similarity.

4. The translation device according to claim 1, further comprising a storage configured to store translation history information including at least one of the input sentence, the first translation sentence, the first reverse translation sentence, the second translation sentence, the second reverse translation sentence, the first similarity to the fourth similarity, and a number of times of repeated translation.

5. A translation device comprising:
   an input unit configured to receive an input sentence in an original language;
   a controller configured to generate a first translation sentence obtained by translation of the input sentence into a first language; and
   a display; wherein
   the controller:
      generates a second translation sentence obtained by translation of the input sentence into a second language different from the first language, a first reverse translation sentence obtained by reverse translation of the first translation sentence into the original language, and a second reverse translation sentence obtained by reverse translation of the second translation sentence into the original language,
      calculates first similarity as similarity between the first reverse translation sentence and the input sentence and second similarity as similarity between the second reverse translation sentence and the input sentence,
      displays the first translation sentence on the display when the first similarity is more than or equal to the second similarity,
      generates a third translation sentence obtained by translation of the second reverse translation sentence into the first language when the first similarity is less than the second similarity,
      generates a fourth translation sentence obtained by translation of the second reverse translation sentence into the second language,
      generates a third reverse translation sentence obtained by reverse translation of the third translation sentence into the original language, and a fourth reverse translation sentence obtained by reverse translation of the fourth translation sentence into the original language,
      calculates third similarity as similarity between the third reverse translation sentence and the second reverse translation sentence, and fourth similarity as similarity between the fourth reverse translation sentence and the second reverse translation sentence, and
      when the third similarity is less than the fourth similarity, determines whether or not the third translation sentence is identical with the first translation sentence, and displays the first translation sentence on the display when the third translation sentence is identical with the first translation sentence.

6. The translation device according to claim 5, wherein the controller displays the fourth reverse translation sentence along with the first translation sentence on the display.

7. A translation method comprising:
   receiving an input sentence in an original language at an input unit;
   generating, at a calculator, a first translation sentence obtained by translation of the input sentence into a first language, and a second translation sentence obtained by translation of the input sentence into a second language different from the first language;
   generating, at the calculator, a first reverse translation sentence obtained by reverse translation of the first translation sentence into the original language, and a second reverse translation sentence obtained by reverse translation of the second translation sentence into the original language;
   calculating, at the calculator, first similarity as similarity between the first reverse translation sentence and the input sentence and second similarity as similarity between the second reverse translation sentence and the input sentence;
   displaying the first translation sentence on a display when the first similarity is more than or equal to the second similarity;
   generating, at the calculator, a third translation sentence obtained by translation of the second reverse translation sentence into the first language when the first similarity is less than the second similarity;
   generating, at the calculator, a fourth translation sentence obtained by translation of the second reverse translation sentence into the second language;
   generating, at the calculator, a third reverse translation sentence obtained by reverse translation of the third translation sentence into the original language, and a fourth reverse translation sentence obtained by reverse translation of the fourth translation sentence into the original language;
   calculating, at the calculator, third similarity as similarity between the third reverse translation sentence and the second reverse translation sentence, and fourth similarity as similarity between the fourth reverse translation sentence and the second reverse translation sentence; and
   displaying the third translation sentence on the display when the third similarity is more than or equal to the fourth similarity.

8. A non-transitory computer-readable recording medium storing a program causing a computer to execute the translation method according to claim 7.

* * * * *